(12) United States Patent
Hedrick et al.

(10) Patent No.: US 7,382,448 B1
(45) Date of Patent: Jun. 3, 2008

(54) ALIGNMENT SYSTEM FOR OBSERVATION INSTRUMENTS

(75) Inventors: Richard L. Hedrick, San Pedro, CA (US); Andre Paquette, Carp (CA)

(73) Assignee: Celestron Acquisition, LLC, Torrance, CA (US)

( * ) Notice: Subject to any disclaimer, the term of this patent is extended or adjusted under 35 U.S.C. 154(b) by 333 days.

(21) Appl. No.: 11/082,473

(22) Filed: Mar. 16, 2005

(51) Int. Cl.
G01B 11/26 (2006.01)

(52) U.S. Cl. ............ 356/139.01; 356/399; 356/139.03; 356/139.04

(58) Field of Classification Search ............... 356/399, 356/138, 139.05, 139.06; 359/429, 430; 350/3, 3.13–3.16, 6, 8, 20, 21, 139.02, 139.01, 350/139.04, 139.05, 139.06, 399, 138; 250/260.1, 250/206.2, 203.6, 201.1, 203.1, 203.3; 382/190, 382/103, 201, 206
See application file for complete search history.

(56) References Cited

U.S. PATENT DOCUMENTS

| | | |
|---|---|---|
| 3,571,567 A | 3/1971 | Eckermann |
| 4,082,462 A | 4/1978 | Owen |
| 4,083,636 A | 4/1978 | Owen |
| 4,129,278 A | 12/1978 | Bressler |
| 4,281,928 A | 8/1981 | Brunson |
| 4,682,091 A | 7/1987 | Krewalk et al. |
| 4,709,178 A | 11/1987 | Burr |
| 4,764,881 A | 8/1988 | Gagnon |
| 4,790,641 A | 12/1988 | Halldorsson |
| 4,927,252 A | 5/1990 | Burr |
| 5,124,844 A | 6/1992 | Wraight |
| 5,177,686 A | 1/1993 | Boinghoff et al. |
| 5,347,286 A | 9/1994 | Babitch |
| 5,446,465 A | 8/1995 | Diefes et al. |
| 5,489,142 A | 2/1996 | Mathieu |
| 5,537,250 A | 7/1996 | Masunaga et al. |
| 5,555,160 A | 9/1996 | Tawara et al. |
| 5,574,465 A | 11/1996 | Okada |
| 5,600,491 A | 2/1997 | Hull et al. |
| 5,745,869 A | 4/1998 | van Bezooijen |
| 5,809,457 A | 9/1998 | Yee et al. |

(Continued)

FOREIGN PATENT DOCUMENTS

WO    WO 97/11882    4/1997

(Continued)

*Primary Examiner*—Gregory J. Toatley, Jr.
*Assistant Examiner*—Abdullahi Nur
(74) *Attorney, Agent, or Firm*—Jeffer Mangels Butler & Marmaro LLP

(57) ABSTRACT

A method and apparatus is disclosed for aligning an optical instrument with respect to a celestial coordinate system, the optical instrument having a field of view and an optical instrument coordinate system, the celestial coordinate system having a plurality of objects each having celestial coordinates. The method includes the steps of receiving a plurality of captured optical instrument positions in the optical instrument coordinate system along with a plurality of associated capture times; calculating, for each associated capture time in the plurality of capture times, coordinates in the optical instrument coordinate system for the plurality of objects to create a plurality of calculated object positions for each associated capture time; and, determining, for each associated capture time, a match for each captured optical instrument position in the plurality of captured optical instrument positions with the plurality of calculated object positions to create a list of actual alignment objects.

57 Claims, 5 Drawing Sheets

U.S. PATENT DOCUMENTS

| | | | |
|---|---|---|---|
| 5,822,116 A | 10/1998 | Leblanc | |
| 5,828,814 A | 10/1998 | Cyman et al. | |
| 5,907,433 A | 5/1999 | Voigt et al. | |
| D412,920 S | 8/1999 | Diebel et al. | |
| 5,935,195 A | 8/1999 | Quine | |
| 5,956,177 A | 9/1999 | Nishikata et al. | |
| 5,983,071 A | 11/1999 | Gagnon et al. | |
| 6,016,120 A | 1/2000 | McNabb et al. | |
| 6,049,306 A | 4/2000 | Amarillas | |
| 6,102,338 A | 8/2000 | Yoshikawa et al. | |
| 6,108,594 A | 8/2000 | Didinsky et al. | |
| 6,227,496 B1 | 5/2001 | Yoshikawa et al. | |
| 6,289,268 B1 | 9/2001 | Didinsky et al. | |
| 6,324,475 B1 | 11/2001 | Potteck | |
| 6,330,988 B1 | 12/2001 | Liu et al. | |
| 6,369,942 B1 | 4/2002 | Hedrick et al. | |
| 6,392,799 B1 * | 5/2002 | Baun et al. | 359/430 |
| 6,470,270 B1 | 10/2002 | Needelman et al. | |
| 6,512,979 B1 | 1/2003 | Needelman et al. | |
| 6,523,786 B2 | 2/2003 | Yoshikawa et al. | |
| 6,603,602 B1 | 8/2003 | McWilliams | |
| 6,671,091 B2 | 12/2003 | McWilliams | |
| 6,766,227 B2 | 7/2004 | Needelman et al. | |
| 2003/0156324 A1 | 8/2003 | Baun et al. | |
| 2003/0197930 A1 | 10/2003 | Baun et al. | |
| 2004/0047036 A1 | 3/2004 | Baun et al. | |
| 2004/0090673 A1 * | 5/2004 | McWilliams | 359/430 |
| 2004/0233521 A1 | 11/2004 | McWilliams | |

FOREIGN PATENT DOCUMENTS

| | | |
|---|---|---|
| WO | WO 00/25166 | 5/2000 |
| WO | WO 00/25167 | 5/2000 |
| WO | WO 00/25168 | 5/2000 |

* cited by examiner

ALIGNMENT SYSTEM FOR OBSERVATION INSTRUMENTS

FIELD OF THE INVENTION

The present invention relates generally to telescopes and other observation instruments and, more particularly, it relates to an alignment system for observation instruments.

BACKGROUND OF THE INVENTION

The alignment and determination of an initial orientation is critical to the operation of any observation instrument, such as a telescope. Traditionally, a telescope is aligned by a two-star alignment process, where the telescope is aligned to a first star, and then the telescope is aligned to a second star. One of the requirements of the two-star alignment system is that the stars must be known.

There are numerous designs for mounting astronomical telescopes, including equatorial and altitude-azimuth (altazimuth or Alt-Az) mounts. A mount is said to be equatorial if one of its two axes can be made parallel with the Earth's axis of rotation. The equatorial mount includes a rotatable polar shaft (to be made parallel to the Earth's axis of rotation), a stationary support for the polar shaft, a rotatable declination shaft that is secured to the telescope, and a member which is secured to the polar shaft and which rotatably supports the declination shaft. In an equatorial mount configuration, aligning the telescope to the Earth's axis is needed for tracking objects across the sky (either manually or with a motor drive) at high magnifications. The alignment is also needed in order to use setting circles to locate faint or hard-to-find objects.

To achieve alignment, the polar shaft is initially positioned with its axis in the direction of the North Star, and the telescope is initially fixed on a target object (e.g., star, planet or moon), by rotating it on the shaft axes to a certain position. Because of the rotation of the earth, the polar shaft must be slowly rotated in order to hold the telescope fixed on the selected object. Both automatic and manual drive mechanisms have been provided for this purpose. The automatic devices usually include a motor that is secured to the stationary support and is connected to the polar shaft for rotating the polar shaft at sidereal rate.

Although the operation of the equatorial mount is simple in concept (i.e., only one axis has to be rotated to maintain tracking once the telescope is aligned), it has a number of drawbacks. For example, the drive mechanism for the equatorial mount can be a relatively complicated and expensive mechanism that cannot readily be installed by an average amateur astronomer. In addition, as the size of the telescope increases, a rather large diameter gear must be attached to the polar shaft to obtain the necessary torque to turn the polar shaft. Further, it is difficult to make small changes in the rate of rotation to maintain a fix on a planet or the moon with drive mechanisms that do not have variable drive rates.

An Alt-Az mount is a mount in which, with respect to the surface of the Earth, one axis (altitude) is vertical and the other (azimuth) is horizontal. Although both axes must be driven at rates that vary with the position in order to maintain tracking to the target object, a computer can easily handle the variable drive rates. The benefits of the Alt-Az mounting become more important as the telescope becomes larger. For example, rotation about the vertical altitude axis does not change the orientation of the telescope tube with respect to gravity, so that this motion does not change any aspect of the flexure of the support. In effect, an Alt-Az mount is a fork mounting with one of the axes vertical so that the tines have no transverse load at all. The Alt-Az mount obviates the twisting of the fork tines that makes it so difficult to design the declination axle bearings of the equatorially mounted telescope. Longer tines are now practicable and the horizontal elevation (altitude) axis can be nearer the mid-point of the telescope tube.

Regardless of which type of mount is used, it must be aligned in order for any telescope to be setup. For example, for a computerized telescope to be aligned to the sky, it needs at least two alignment stars as reference. For experienced telescope users and astronomers, this is not a problem because they can identify many of the stars in the sky. However, for a beginner, the alignment process can be a big obstacle. A beginner may not be able to locate or identify any of the stars to be able to align the telescope. Thus, a beginner cannot point the telescope to a star and tell the telescope that it is pointed at a particular star. Further, even in conventional alignment systems such as that described by U.S. Pat. No. 6,392,799, entitled "Fully Automated Telescope System with Distributed Intelligence," where the mount may be aligned by being positioned with respect to terrestrial orientations (such as being leveled and pointed in a particular magnetic direction), the user has to know a particular magnetic direction (e.g., North), and level the mount with respect to the horizontal.

A "fully" automated alignment system has been proposed in "Automatic Telescope", filed as U.S. patent application Ser. No. 10/438,127 on May 14, 2003, and published as U.S. Patent Application Pub. No. US2004/0233521, describes an alignment system that does not require the user to interact with the telescope during the alignment process. Specifically, this system describes the use of angular separations between a group of "bright" stars that is chosen by an imager in the telescope as data points to help identify the stars.

As angular separation between stars does not change with the observer's time or location (and hence the time/location does not need to be known), this system has the advantage of not needing an accurate time or location input and also has the advantage of being able to derive the local sidereal time (a relative measurement of time based on the observer's location) once the identification is complete. However, this system anticipates the need to use four stars to generate six unique data points that can then be used to reliably identify the stars from an exemplary field of stars in FIG. 1, as illustrated in FIG. 2. In addition, this system is less accessible to beginning users with small telescopes because the system includes the added cost of an imaging system along with the cost for a processor that can support the processing needed for the images generated by the imaging system as well as the alignment procedure of the align system itself.

Further, certain environments can make locating bright stars difficult with a fully automated system. For example, transient objects like airplanes can confuse the system as the warning strobes on the planes may fool it into identifying the plane as a "bright object." Also, automated systems do not have awareness of—and therefore will not avoid scanning of—obstructed portions of the sky (e.g., portions of the sky blocked by trees, clouds, building, etc.). A particularly problematic situation would be where a user wishes to perform an automated alignment from a location such as the balcony of a high-rise building.

One benefit often touted for automated alignment systems is that they are supposed to make set-up enjoyable and simple for the novice user. Ironically, a fully automated approach reduces the educational aspect of setting up a telescope because, during the setup process performed by these automated systems, it is often not obvious where the telescope is pointing to acquire alignment objects and hence the user would not gain any insight into the night sky. Even if the automated system included an imager, and a display is attached to it so as to display the images captured from the imager, the user still will not gain any sense for where the telescope is actually pointing. For example, if the user is standing at a telescope that is pointing somewhere, it will be difficult for the user to tell which one of the stars in the sky at which the telescope is actually pointing—even if the display is displaying the star and the star's name. Thus, the user would have to go to the telescope and sight along the tube or look through a finderscope.

Accordingly, there is a need to overcome the issues noted above.

SUMMARY OF THE PREFERRED EMBODIMENTS

The present invention provides an alignment system for aligning an optical instrument such as a telescope with the celestial coordinate system.

It is an object of the present invention to provide a method for aligning an optical instrument with respect to a celestial coordinate system, the optical instrument having a field of view and an optical instrument coordinate system, the celestial coordinate system having a plurality of objects each having celestial coordinates. The method includes the steps of receiving a plurality of captured optical instrument positions in the optical instrument coordinate system along with a plurality of associated capture times; calculating, for each associated capture time in the plurality of associated capture times, coordinates in the optical instrument coordinate system for the plurality of objects to create a plurality of calculated object positions for each associated capture time; and, determining, for each associated capture time, a match for each captured optical instrument position in the plurality of captured optical instrument positions with the plurality of calculated object positions to create a list of actual alignment objects.

It is also an object of the present invention to provide an alignment system for aligning an optical instrument with respect to a celestial coordinate system, the optical instrument having a field of view and an optical instrument coordinate system. The alignment system having a processor; an object database storing a plurality of objects, each having celestial coordinates; and, a computer-readable medium. The computer-readable medium having instructions stored thereon that, when executed by the processor, performs the steps of receiving a plurality of captured optical instrument positions in the optical instrument coordinate system along with a plurality of associated capture times; calculating, for each associated capture time in the plurality of associated capture times, coordinates in the optical instrument coordinate system for all objects in the plurality of objects to create a plurality of calculated object positions for each associated capture time; and, determining, for each associated capture time, a match for each captured optical instrument position in the plurality of captured optical instrument positions with the plurality of calculated object positions to create a list of actual alignment objects.

It is yet another object of the present invention to provide a computer readable medium having instructions stored thereon, wherein the stored instructions, when executed by a processor, in an optical instrument having a field of view and an optical instrument coordinate system, cause the processor to perform a method for aligning the optical instrument with respect to a celestial coordinate system, the celestial coordinate system having a plurality of objects each having celestial coordinates. The method including the steps of receiving a plurality of captured optical instrument positions in the optical instrument coordinate system along with a plurality of associated capture times; calculating, for each associated capture time in the plurality of associated capture times, coordinates in the optical instrument coordinate system for the plurality of objects to create a plurality of calculated object positions for each associated capture time; and, determining, for each associated capture time, a match for each captured optical instrument position in the plurality of captured optical instrument positions with the plurality of calculated object positions to create a list of actual alignment objects.

Other objects, features and advantages of the present invention will become apparent to those skilled in the art from the following detailed description. It is to be understood, however, that the detailed description of the various embodiments and specific examples, while indicating preferred and other embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

The present invention provides a method and apparatus for allowing users to align an observation instrument, such as a telescope, by having the user point the observation instrument to two or more celestial objects (alignment objects) in the sky. The user does not have to know the identity or coordinates of the alignment objects. In one preferred embodiment, the inventive method and apparatus determines the identification of the alignment objects by measuring the change in position in each axis between the alignment objects and comparing them to the calculated change in each axis between possible objects in a database given a time and location. The inventive method and apparatus investigates all permutations of the alignment objects against the database to determine what database objects match the alignment objects. The database object matches are identified as the alignment objects and, subsequently, used in the alignment of the observation instrument using alignment techniques such as the two-star alignment process or another alignment process. The alignment of the observation instrument will allow the conversion of coordinate values between the celestial coordinate system and the optical instrument coordinate system.

In one preferred embodiment, the observation instrument uses an Alt-Azimuth mount where a polar coordinate system is used for both the observation instrument and the celestial coordinates. In another preferred embodiment, the observation instrument uses an equatorial mount where a polar coordinate system is used for both the observation instrument and the celestial coordinates. In yet another preferred embodiment, regardless of the type of mount of the observation instrument, the coordinate system used for the observation instrument and the celestial coordinate systems may employ either polar or rectangular coordinates. The description of the preferred embodiment contained herein is not meant to be limiting on the type of coordinate system that may be used.

Figure 3:
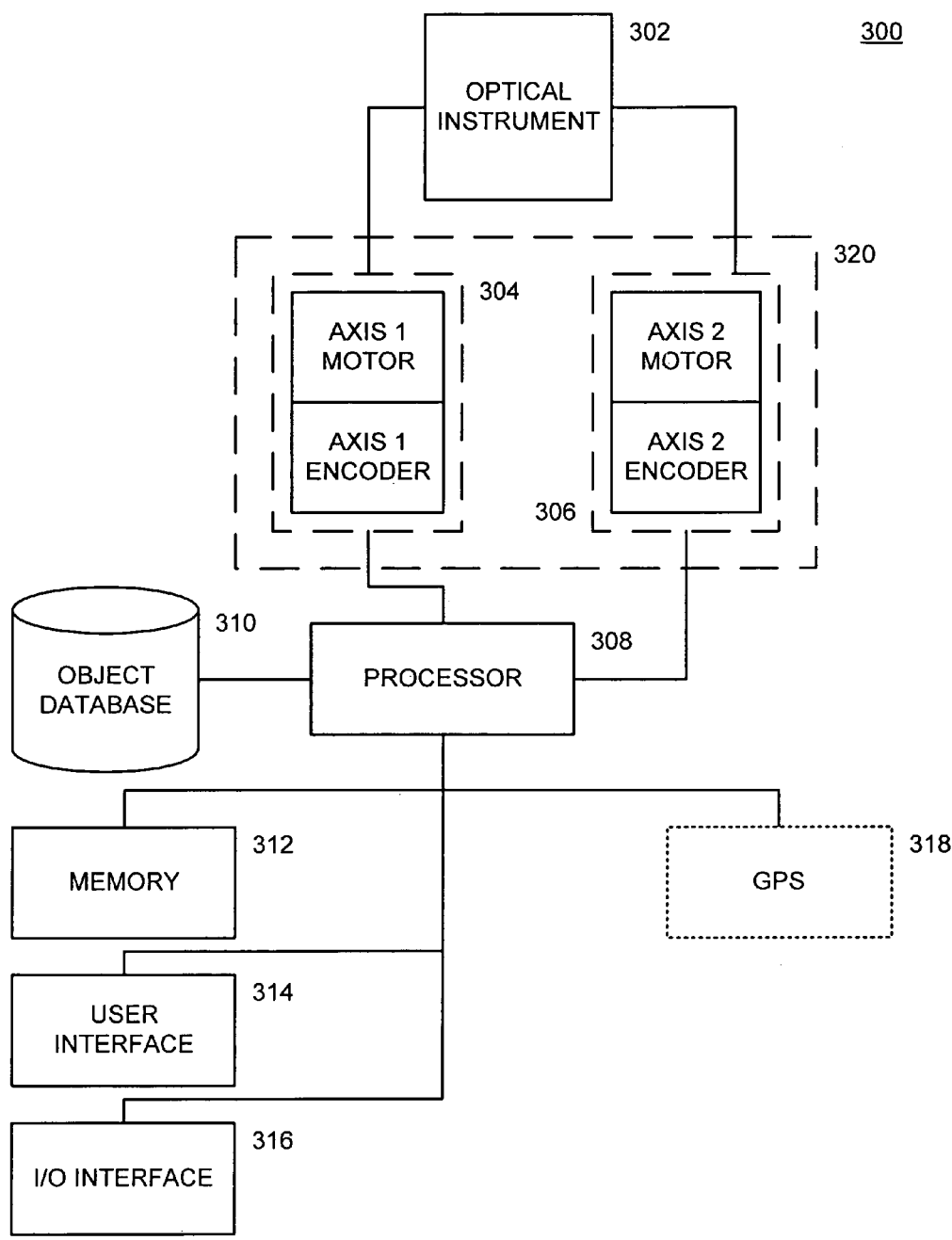
FIG. 3 is a block diagram of an observation instrument alignment system configured in accordance with one preferred embodiment of the present invention.

FIG. 3 illustrates an alignment system 300 configured in accordance with one embodiment of the present invention, where an optical instrument 302 is moved by an axis 1 mover 304 and an axis 2 mover 306, each having an axis motor and an axis encoder. The axis movers are integrated as a part of a mount 320. In one preferred embodiment, mount 320 is an altitude-azimuth (Alt-Az) mount. In another preferred embodiment, mount 320 is an equatorial mount. As discussed herein, the orientation of each of these types of mounts may be expressed in either polar (e.g., spherical) or rectangular coordinates.

A processor 308 is coupled to axis 1 mover 304 and axis 2 mover 306 to both detect and control the movement of optical instrument 302. Processor 308 is further coupled to a memory 312, a user interface 314, an input/output (I/O) interface 316 and, optionally, a Global Positioning System (GPS) unit 318. In one preferred embodiment of the present invention, optical instrument 302 is a telescope that may have an eyepiece through which the user may view the field of view provided by the optics of the telescope. In another embodiment, an analog or digital imaging system (not shown) may be used in addition or in place of the eyepiece to display the field of view of optical instrument 302. If an analog or digital imaging system is provided in optical instrument 302, processor 308 may also be coupled to the imaging system.

Optical instrument 302 has position indicators that keep track of the movement of the telescope from some arbitrary initial position (e.g., encoders measuring movement of the telescope with respect to each axis). The initial position may need to be stored if the encoders are not reset to zero or some default value upon the initialization of alignment system 300. Knowledge of the initial position is not required, unless the alignment or alignment objects of a previous session is being applied to the current session. The axis motors move optical instrument 302 based on the detected position of optical instrument 302 by the axis encoders. The axis motors may be actuated by a variety of motor technologies, including alternating current (AC) motors, direct current (DC) motors, brushless DC motors, servo motors, stepper motors, linear motors, pulse width modulation (PWM) motors, etc. The axis motors include all bearings, chains, sprockets, gearing and other force transfer system components necessary to obtain enough torque and/or speed necessary to move optical instrument 302.

The axis encoders may include all types of position encoders/detectors utilizing various sensor technologies, including those based on optical sensors, magnetic (Hall-effect) sensors, resistance sensors or others. In addition, in a preferred embodiment, axis movers 304, 306 each include an intelligent motor controller that is able to move optical instrument 302 in a respective axis to a particular position based on the receipt of a coordinate (e.g., a RA-Dec or Alt-Az coordinate), from processor 308. In another embodiment, axis movers 304, 306 only include enough intelligence to move to a particular position based on a detected position as detected by the axis encoders. In yet another embodiment, axis movers 304, 306 do not include any intelligence in the sense that processor 308 will control the axis motors based on the encoded position that processor 308 receives from the axis encoders. It should be noted that the axis movement control and detection system may be implemented in many ways, and thus should not limit the application of the present invention.

In one embodiment, processor 308 may be a general-purpose processor or an application specific integrated circuit (ASIC). In another embodiment, processor 308 may be a part of a computer system (e.g., a desktop or laptop) that is adapted to communicate with axis 1 mover 304 and axis 2 mover 306. In yet another embodiment, processor 308 may be implemented as part of a hand controller that may be connected to a motorized optical instrument. In yet still another embodiment, alignment system 300 may be implemented as a distributed computing system over a network, including a local area network or a wide area network such as the Internet. Memory 312 may be integrated as part of processor 308 or a separate memory device. Memory 312 may be composed of non-volatile and volatile memory for storage of the algorithms and data necessary to operate alignment system 300. The implementation of the calculation and data storage necessary for the operation of alignment system 300 should not be limited to a particular system.

Processor 308 may query an object database 310 to retrieve information, such as RA-Dec coordinates, about any celestial body. Object database 310 may also include information from such sources as an ephemeris, astronomical almanacs, or other databases. For example, object database 310 may contain description information about each of the celestial bodies stored therein, such as information related to the discovery of the celestial body, related stars, etc. In a preferred embodiment, database 310 comes preloaded in alignment system 300. In another embodiment, database 310 may be updated through the use of I/O interface 316. Database 310 may include solar system objects such as a planet, the Sun or the Moon.

As further described below, alignment system 300 requires certain information be obtained during the alignment process. User interface 314, I/O interface 316 and, optionally, GPS unit 318, may be used to provide any information that is required by alignment system 300. In one embodiment, user interface 314 includes a display and a keypad or a set of buttons that allow users to input such information as time, date, latitude and longitude as well as coordinates for celestial bodies. The keypad may be used to provide motor direction control to allow the user to point optical instrument 302 under manual control to a particular reference location. The display is used to give a visual indication of information to the observer, such as the right ascension and declination or altitude and azimuth of the particular star to which the telescope is currently aligned, error/informational messages or data inputted through the keypad. In addition, I/O interface 316 may be a common interface that connects alignment system 300 with another computer system (not shown). Further, GPS unit 318 may be used to obtain position and clock information.

Figure 4:
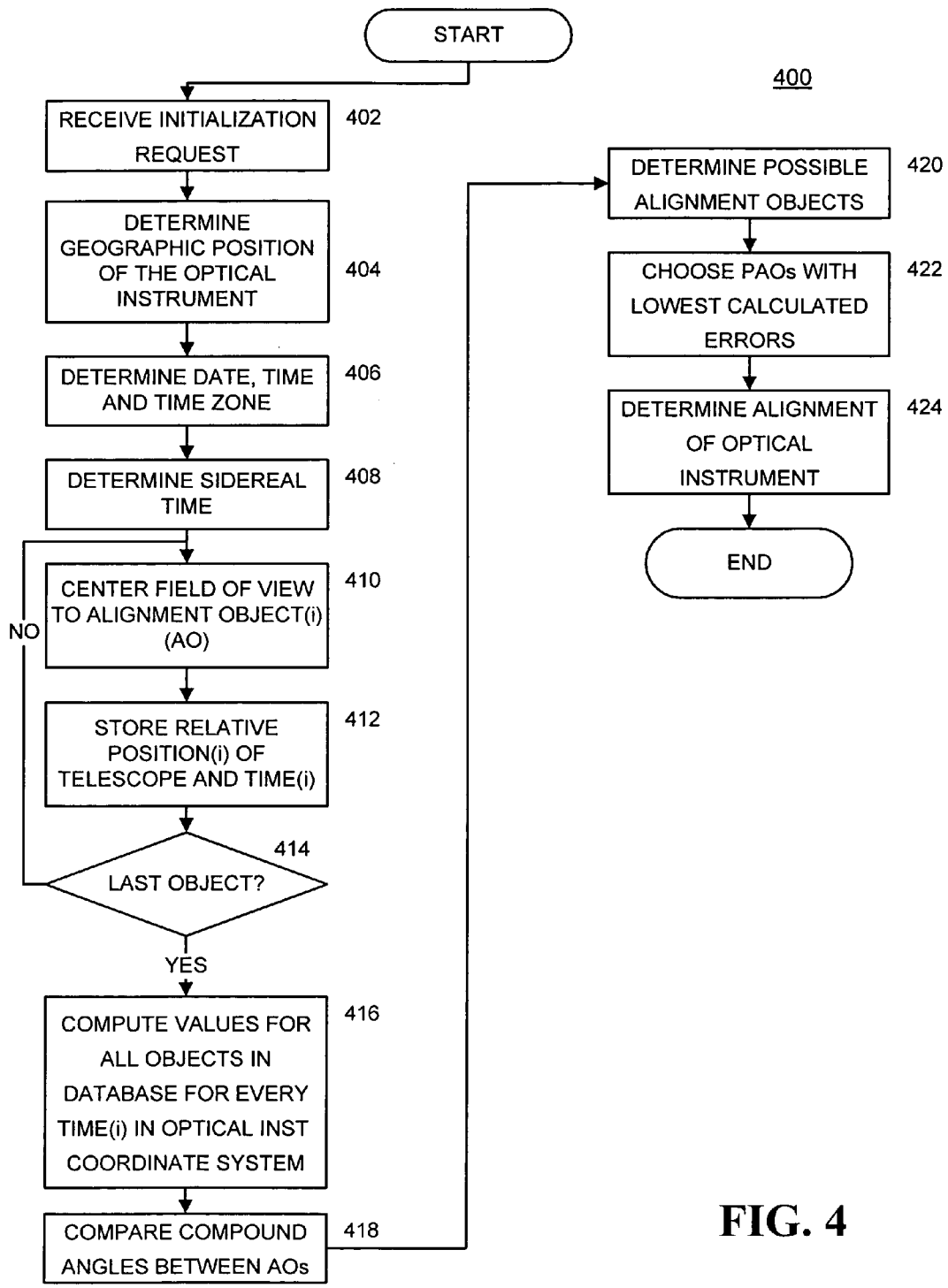
FIG. 4 is a flow diagram of the operation of the observation instrument alignment system in accordance with one preferred embodiment of the present invention; and, FIG. 5 is an exemplary view of the field of stars of FIG. 1 that is used to describe the operation of the observation instrument alignment system of FIG. 3.

FIG. 4 illustrates a flow diagram 400 of the operation of alignment system 300 in accordance with one preferred embodiment of the present invention to align optical instrument 302 to the celestial coordinate system. Specifically, the alignment process will allow translation between the coordinate system of optical instrument 302, which is Alt-Az, with the celestial coordinate system, which is in RA-Dec.

In step 402, processor 308 receives an alignment initialization request, which in one embodiment is automatically generated when processor 308 is first powered on. In another embodiment, the alignment initialization request is generated by the user. For example, the user may generate the request by selecting an appropriate menu item on a GUI or particular key on a keypad. In yet another embodiment, the alignment initialization request may be generated as part of another procedure, and as such be called as a subroutine. Once the alignment initialization request has been generated, operation continues with step 404.

In step 404, processor 308 will determine the position information for optical instrument 302 on the earth. The position information is typically determined in Longitude and Latitude. In a preferred embodiment, the user, using user interface 314, directly inputs the Latitude and Longitude. In another embodiment, the position information is determined from the user inputting particular address information, such as a street address or a postal code. In yet another embodiment, the position information is obtained from GPS unit 318. In still yet another embodiment, the position information may be obtained from another computing device coupled to I/O interface 316. For example, a desktop or laptop computer coupled to I/O interface 316 may provide the position information to processor 308.

In step 406, processor 308 receives the local time, date, and time zone information (collectively referred to herein as "time information"). In a preferred embodiment, the user inputs the time information using user interface 314. In another embodiment, processor 308 retrieves the time information from a clock/timer either onboard to processor 308 or integrated into another component of alignment system 300 that has been previously set. In yet another embodiment, processor obtains the time information from GPS unit 318. In still yet another embodiment, a computer coupled to I/O interface 316 may provide the time information.

Once processor 308 has received the time information in step 406, it can calculate the local sidereal time in step 408. In one embodiment, processor 308 may also receive the local sidereal time as part of the time information it receives in step 406, and both time and position information are required to derive the local sidereal time. In yet another embodiment, the user may enter the local sidereal time directly. In still yet another embodiment, the information may be provided through I/O interface 316.

In step 410, alignment system 300 prompts the user to move the optical instrument 302 to a celestial body chosen by the user to be a first alignment object (AO1). In a preferred embodiment, the celestial body may be any bright object (e.g., star or planet) that is visible to the naked eyes of the user. For example, the user may be prompted to select as bright of an object as possible. The user does not have to know the name or otherwise identify the object. In another embodiment, the alignment object may be any star that is in the telescope's database of stars.

In one embodiment, user interface 314 prompts the user to locate and center AO1 in the field of view of the optical instrument 302 via a visual or audible message. A crosshair or other optical indicia may be provided to assist the user in centering AO1. In another embodiment, where a separate device (e.g., computer) is coupled to I/O interface 316, the separate device may prompt the user to locate and center AO1. In one embodiment, the user moves optical instrument 302 manually, without the use of axis 1 mover 304 and axis 2 mover 306. In another embodiment, the user moves optical instrument 302 using axis 1 mover 304 and axis mover 306, thus allowing alignment system 300 to track how much distance optical instrument 300 is moved in either axis.

In step 412, the user notifies processor 308 that AO1 is centered in the field of view of optical instrument 302. In one embodiment, the user may use user interface 314 to provide a signal that AO1 is centered. In another embodiment, the user may use a device coupled to I/O interface 316 to provide a signal that AO1 is centered. As discussed, if there are other computing devices that are used instead of or in addition to processor 308 to perform the alignment, then the other device may receive the AO1 centered signal. Once processor 308 receives notification that AO1 is centered, it stores the relative position of optical instrument 302 in step 412 as Position1. In one embodiment, the position information stored includes the azimuth and the altitude information of optical instrument 302 as measured by axis 1 mover 304 and axis 2 mover 306. In another embodiment, the information stored is the encoder positions as measured by axis 1 encoder and axis 2 encoder (e.g., current encoder positions). Processor 308 also stores the time of receipt of the signal that AO1 is centered in the field of view, which is also referred to as the optical instrument position capture time, as Time1.

In step 414, processor 308 determines if the user has pointed optical instrument 302 at a sufficient number of alignment objects. In one embodiment, the number is predetermined by alignment system 300. In another embodiment, the number may be selected by the user. At a minimum, the number must be greater than or equal to two (2). As the number of alignment objects are increased, the greater the certainty is of correctly identifying the alignment objects using the matching process described below. The number of alignment objects used can include the alignment objects that have been used in a previous alignment, but only if: (1) alignment system 300 maintains positional information of optical instrument 302 (e.g., optical instrument 302 has not been moved without the use of axis 1 mover 304 and axis 2 mover 306 or the encoders tracking the movement); and (2) positional and time information for the previous alignment objects are maintained. As long as alignment system 300 is able to maintain the alignment information of optical instrument 302 temporally, then additional alignment objects may be used to enhance the alignment of optical instrument 302.

If processor 308 determines that the minimum number of alignment objects have not been reached in step 414, then it will return to step 410, where the user will be asked to move optical instrument 302 to an additional alignment object and center it in the field of view of optical instrument 302. For example, the user will be asked to move optical instrument 302 to a second alignment object (AO2) and center AO2 in the field of view of optical instrument 302. In addition, in the second iteration of step 412, once the user notifies processor 308 that AO2 is centered in the field of view, processor 308 stores the relative position of the telescope as Position2. Further, processor 308 will store the time as Time2. In one preferred embodiment, processor 308 will execute step 410 and step 412 as many times as required to reach a level of certainty of identifying the alignment objects using the matching steps, as further described herein. For the purposes of the following description, processor 308 will repeat steps 410 and 412 one additional time to capture Position3 and Time3.

Once the positions and times for the minimum number of alignment objects have been captured, operation will proceed with step 416, where alignment system 300 calculates the coordinates of all objects in object database 310 with respect to the coordinate system of optical instrument 302 at each optical instrument position capture time and the date and the observer's location. In a preferred embodiment, processor 308 will compute the coordinate system values for optical instrument 302 for all the stars in object database 310 at times Time1, Time2 and Time3 given the time, date and the observer's location. The computation may include factors to account for precession, proper motion, nutation, refraction, and other such deviations. Also, it should be noted that there are planets (and the Moon) in addition to stars in object database 310, and the computation is different for these objects. The results of the calculations for all objects are referred to as Calculated Objects (CO), with a reference to a specific object number i in a CO as CO(i). As referred to herein, for example, CO1 is the set of calculated optical instrument 302 coordinate system values for all the objects in object database 310 at Time1, and CO1(i) is object i in CO1. Although as described the calculation of the COs is performed at step 416, the calculations may be performed after each capture of position and time by processor 308. Thus, the calculation of each CO can occur after step 412 but before step 414. For example, the calculations necessary for CO1 can occur after the first iteration of step 410 and step 412; the calculations necessary for CO2 can occur after the second iteration of step 410 and step 412; and, the calculations necessary for CO3 can occur after the third iteration of step 410 and step 412.

In step 418, processor 308 compares the angles between each of the alignment objects (i.e., AO1/AO2, AO2/AO3, and AO1/AO3). In a preferred embodiment, processor 308 determines the change in each axis of the optical instrument coordinate values between the two AOs being compared. For example, for the AO1/AO2 pair, processor 308 calculates:

$AO12[axis1]=AO1[axis1]-AO2[axis1]$, which is the difference between the respective values of AO1 and AO2 on axis1 of the optical instrument coordinate system; and, $AO12[axis2]=AO1[axis2]-AO2[axis2]$, which is the difference between the respective values of AO1 and AO2 on axis2 of the optical instrument coordinate system. In another embodiment, where there are more than three possible pairings of the AOs, such as where there are more than three AOs acquired by the user, processor 308 may choose to perform the calculations for only a limited subset of pairings. For example, processor 308 may compare the differences between only one of the axes (e.g., axis1 or axis2).

In step 420, processor 308 determines the possible pairings of objects in the COs that fall within a given error threshold. In one embodiment, the error threshold is 5 degrees, which is calculated as the root-mean-squared error of the difference between the expected change in each axis and the actual change in each axis. In other embodiments, the error threshold may be chosen to reduce the search space (i.e., the number of pairs that need to be calculated and searched) if processing resources are of concern. If no error threshold is used, then all pairings may be searched. The choice of a particular threshold to limit the number of alignment objects searched should not limit the application of the present invention. Consequently, processor 308 will compare the change in the calculated optical instrument coordinate system values for each axis of each object in CO1 with each object in CO2. Processor 308 will also compare the change in the calculated optical instrument coordinate system values for each axis of each object in CO2 with each object in CO3, and each object in CO1 with each object in CO3.

Specifically, processor 308 will calculate:

$CO12[axis1](n,m)=CO1[axis1](n)-CO2[axis1](m)$, which is the difference between the respective axis1 values of an object n of CO1 and an object m of CO2; and:

$CO12[axis2](n,m)=CO1[axis2](n)-CO2[axis2](m)$, which is the difference between the respective axis2 values of the object n of CO1 and the object m of CO2. Processor 308 will then compare the calculated differences of the objects in the COs to the differences of the respective alignment objects. For example, processor 308 will compare the values of CO12[axis1](n,m) and CO12[axis2](n,m) to AO12[axis1] and AO12[axis2], respectively. If the differences between the respective angles are of a level smaller than the error threshold, then CO1(n) and CO2(m) are considered to be possible alignment objects (PAOs) corresponding to AO1 and AO2, respectively (i.e., CO1(n) and CO2(m) from object database 310 are the possible identities of AO1 and AO2, respectively). Processor 308 will also determine CO23[axis1], CO23[axis2], CO13[axis1], and CO13[axis2] for all objects and compare them to AO23 [axis1], AO23[axis2], AO13[axis1], and AO13[axis2], respectively, to find all PAOs. The list of PAOs includes the calculated error for each object in the list.

Optimization techniques based on the temporal and positional knowledge of alignment system 300 may be used during either step 418 and/or step 420 to decrease the time and resources necessary to perform the alignment process. In one embodiment, during step 418, processor 308 can limit the CO calculations to only objects in object database 310 that would be visible in the sky based on the particular time of capture and the geographical position of optical instrument 302. For example, if optical instrument 302 is in Los Angeles, Calif., United States of America, at approximately 10:00 PM PST on Dec. 1, 2002, then the calculation for Arcturus would not be performed as it should not be visible.

In one embodiment, if the user knows the identity of one or more of the celestial bodies the user chooses as an alignment object, then alignment system 300 can skip the steps described above for identifying the known AO. In this embodiment, alignment system 300 will prompt the user to center the known object in the field of view of optical instrument 302, after the user has indicated that the object has been centered, alignment system 300 will prompt the user to enter the identity of the object. To enter the identity of the object, the user can search object database 310 for a name of the object, or the user can input the name of the object or the coordinates of the object. Although in this embodiment the user may enter the identity of the object, as noted above, this knowledge is not necessary for the implementation of the system.

In step 422, processor 308 selects an object from the list of PAOs for each one of AO1, AO2, and AO3 with the lowest calculated error to be the actual alignment objects, AAO. Once the AAOs have been identified, then optical instrument 302 may be aligned using traditional alignment algorithms such as the two-star alignment process, with the third alignment object being used as a further alignment star. Also, as discussed above, during step 420 processor 308 may search for matches only for the COs that would be visible during a respective time and location of capture. Thus, although the COs from step 418 may include all the objects in object database 310, some objects in the COs would not be candidates as they are not visible during the time of capture (e.g., Time1, Time2 or Time3), given the observation date and location.

In step 424, once the objects have been identified, optical instrument 302 may be aligned using a two-star alignment process with two of the identified objects. In other embodiments, any suitable alignment process may be used. Thus, as discussed above, the particular alignment process used to determine the orientation of the coordinate system of optical instrument 302 with the celestial coordinate system.

Once the orientation of optical instrument 302 has been completed, processor 308 can provide a tracking mode of operation, which is where processor 308 moves the field of view of optical instrument 302 to compensate for the Earth's rotation. In one embodiment, processor 308 continuously calculates the current altitude and azimuth angles of an object or field of view. In another embodiment, a tracking rate signal is then sent to axis 1 mover 304 and axis 2 mover motors to move optical instrument 302 accordingly, which results in optical instrument 302 "following" the object (or field of view) as it moves across the sky. Thus, optical instrument 302 may be moved to track any one of the AOs automatically. In another embodiment, where the optical instrument is on an equatorial mount, the tracking may be accomplished by rotating only one axis (e.g., the polar axis) to compensate for the earth's rotation. The tracking mode can be disengaged when the user wishes to move the field of view of optical instrument 302 manually, such as to locate a new celestial object of interest. However, the tracking mode may be automatically engaged once the user has settled on the field of view.

Figure 1:
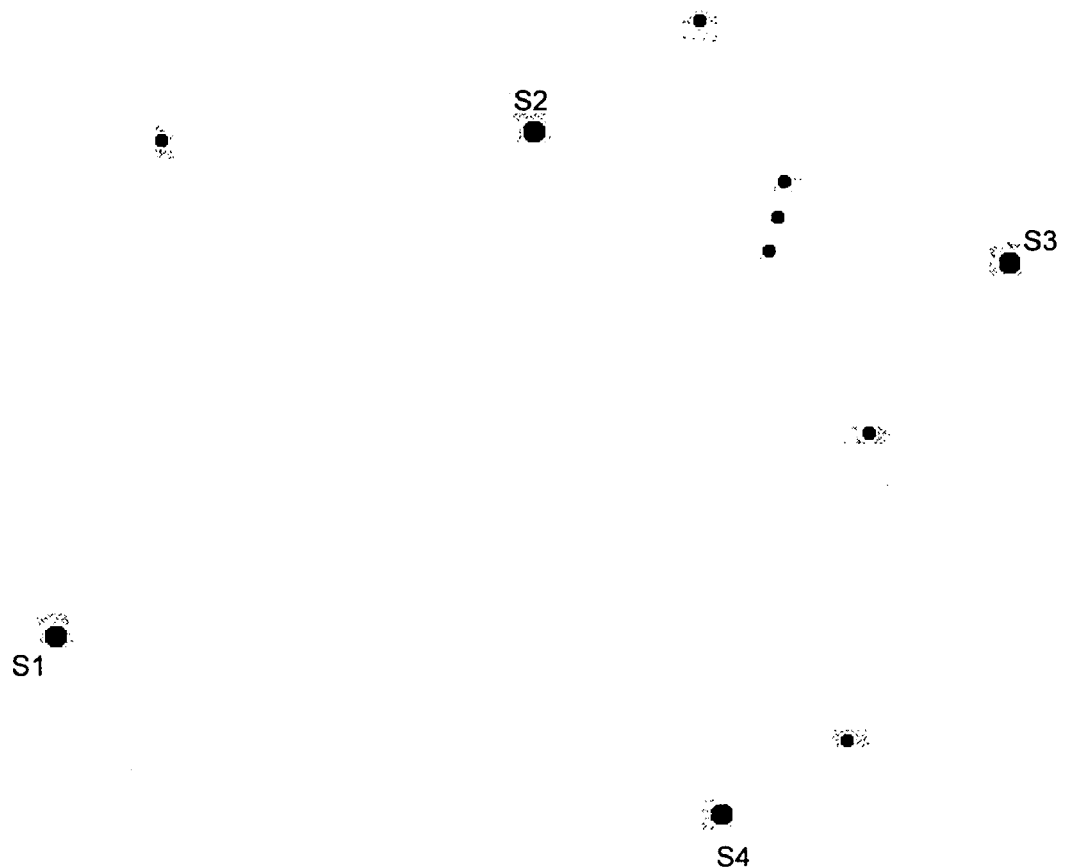
FIG. 1 is a view of an exemplary field of Stars that will be used to describe the various alignment systems discussed herein.
Figure 2:
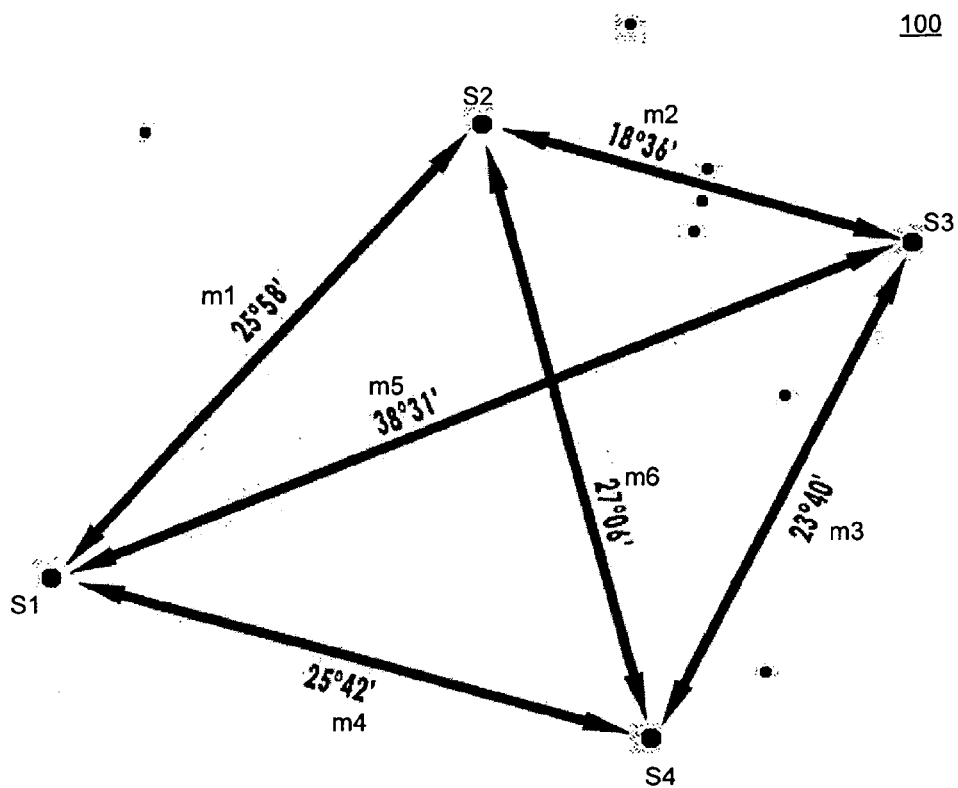
FIG. 2 is an exemplary view of the field of Stars of FIG. 1 that is used to describe a prior art automated telescope alignment system.
Figure 5:
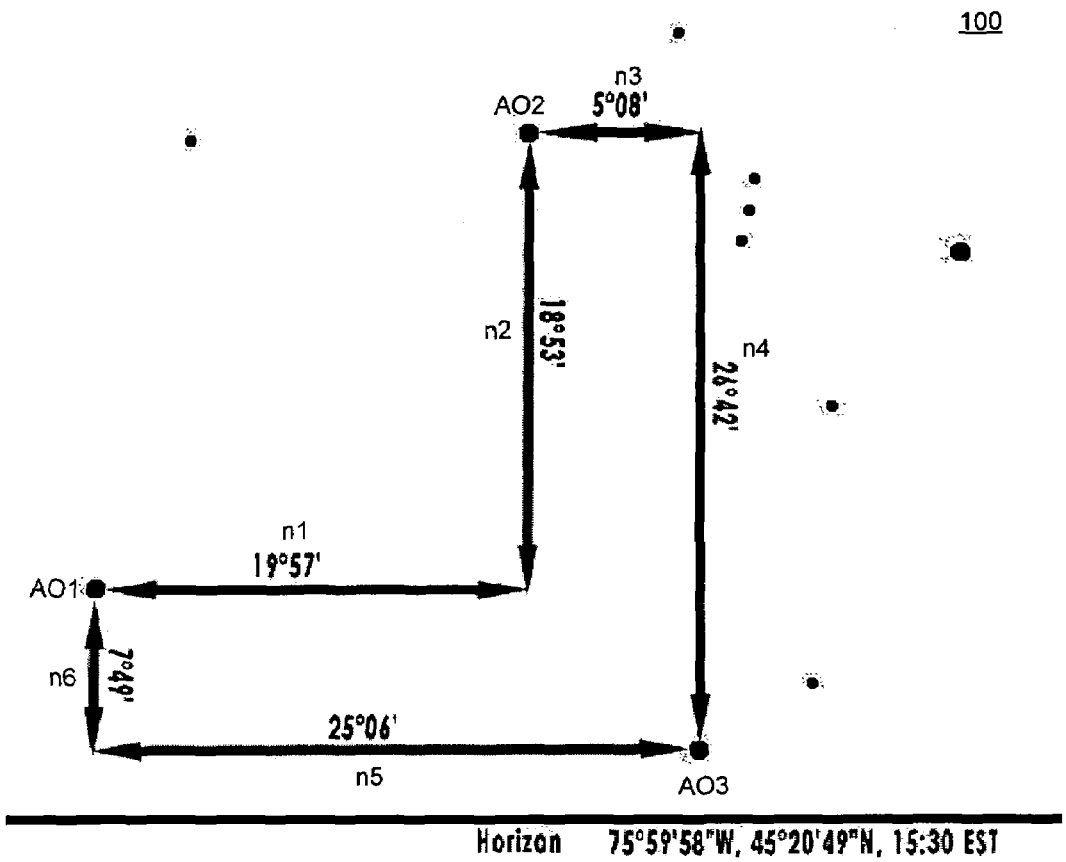

FIG. 5 illustrates an exemplary operation of alignment system 300 with field of stars 300 from FIG. 1, with AO1, AO2 and AO3 being the 3 stars that are to be identified. For purposes of the following description, it is assumed that each star is centered at the same time even though, in actuality, the stars are captured at different times (i.e., three different times—one for each star), as discussed above. Thus, three copies of the expected star positions are generated. Alignment system 300 utilizes the time and position information to generate the expected positions of the stars in the sky.

When the user centers each of the stars chosen for the identification and alignment process, the change in each axis of the mount 320 between the star locations is used to generate the unique data points from which the stars are identified. The relative difference in position between the stars in each axis is dependent on the time and location information of alignment system 300. In this example, alignment system 300 generates 6 unique data points (shown by data points n1 to n6) using the 3 stars (AO1 to AO3). These unique data points can then be used to reliably identify the stars. One advantage of the approach used by the preferred embodiment of the present invention is that alignment system 300 requires fewer stars to perform an alignment as it is provided with time and location information. As discussed above, alignment system 300 can optionally include a GPS device such as GPS unit 318 to provide time and location information without needing assistance from the user. Another advantage provided by alignment system 300 is that by its knowledge of the time and location information a priori, alignment system 300 can ignore stars from object database 310 that would be below the local horizon and thereby increase the performance of the search and decrease drain on resources. The interactive approach provided by automated system 300 serves as an educational tool because a novice user can point to three stars or planets and would then be shown the objects at which they pointed. Also, if the user is involved in the star selection and centering process, then the user would have a general awareness of the stars and the portion of the sky at which the user is pointing. Also, the pointing accuracy of a mount is generally maximized near the alignment stars. Thus, if a user knows which particular area of the sky he or she would like to observe, the user can choose a star near that area during the selection of the three stars in the alignment and hence achieve improved pointing accuracy in the desired region.

The process of identifying the stars AO1 to AO3 involves generating n1 to n6 as the expected changes in each axis between the objects, and then comparing these values between the marked stars and pairs of objects in object database 310. A high-level algorithm description of the steps is as follows:

1. The user selects and marks the location of three starts, AO1, AO2, and AO3.

2. Process 308 then computes:

n1=AO1[axis1]−AO2[axis1]
   n2=AO1[axis2]−AO2[axis2]
   n3=AO2[axis1]−AO3[axis1]
   n4=AO2[axis2]−AO3[axis2]
   n5=AO1[axis1]−AO3[axis1]
   n6=AO1[axis2]−AO3[axis2]

3. For all of the objects in object database 310 that are above the local horizon given the time and location, processor 308 computes:

CO12[axis1](x,y)=CO1[axis1](x)−CO2[axis1](y)
   CO12[axis2](x,y)=CO1[axis2](x)−CO2[axis2](y)    for objects x and y.

4. If CO12[axis1](x,y) and CO12[axis2](x,y) matches n1 and n2 within some threshold, then objects x and y *may* be AO1 and AO2, and processor 308 will compute:

CO23[axis1](y,z)=CO2[axis1](y)−CO3[axis1](z)
   CO23[axis2](y,z)=CO2[axis2](y)−CO3[axis2](z)

5. Similarly, if CO23[axis1](y,z) and CO23[axis2](y,z) matches n3 and n4 within some threshold then objects y and z *may* be AO2 and AO3 and processor 308 will compute:

CO13[axis1](x,z)=CO1[axis1](x)−CO3[axis1](z)
   CO13[axis2](x,z)=CO1[axis2](x)−CO3[axis2](z)

6. Processor 308 will determine if CO13[axis1](x,z) and CO13[axis2](x,z) matches n5 and n6.

7. If so, then there is high probability that objects x, y, and z are AO1, AO2, and AO3.

8. These potential matches x, y, and z are stored and a metric is computed by processor 308 for these potential alignment objects (referred previously as "PAOs") based on the how closely they match the expected values.

9. After all of the object pairings in the database are assessed, the trio of objects with the best metric is chosen as the alignment start AO1 to AO3.

For example, if the threshold is calculated as the root-mean-squared error of the difference between the expected change in each axis and the actual change in each axis and set at 5 degrees, and:

n1<21d57' n2=17d53'

CO12[axis1](x,y)=19d57'

CO12[axis2](x,y)=18d53' then the error would be calculated as:

error=sqrt((21d57'-19d57')^2+(18d53'17d53')^2)=sqrt((2d)^2+(18d53'=17d53')^2)=sqrt((2d)^2+(1d)^2)=sqrt(5d)=2.2 degrees so stars x and y would pass the threshold and alignment system will then continue on to look for a third star that works with the first two.

Although the alignment process described above is described as a sequence of steps, it should be noted that certain steps may be performed out of sequence and/or combined with other steps as necessary. For example, as noted, step 416 may be performed after step 412 and before step 414. Similarly, step 418 may also be performed after step 412, after sufficient object captures have been completed.

The embodiments described above are exemplary embodiments of an optical instrument alignment system configured in accordance with the present invention. Those skilled in the art may now make numerous uses of, and departures from, the above-described embodiments without departing from the inventive concepts disclosed herein. Accordingly, the present invention is to be defined solely by the scope of the following claims.

What is claimed is:

1. A method for aligning an optical instrument with respect to a celestial coordinate system, the optical instrument having a field of view and an optical instrument coordinate system, the celestial coordinate system having a plurality of objects each having celestial coordinates, the method comprising the steps of:
receiving a plurality of captured optical instrument positions in the optical instrument coordinate system along with a plurality of associated capture times;
calculating, for each associated capture time in the plurality of associated capture times, coordinates in the optical instrument coordinate system for the plurality of objects to create a plurality of calculated object positions for each associated capture time; and,
determining, for each associated capture time, a match for each captured optical instrument position in the plurality of captured optical instrument positions with the plurality of calculated object positions to create a list of actual alignment objects.

2. The method of claim 1, further comprising the step of using the plurality of actual alignment objects to align the optical instrument.

3. The method of claim 1, further comprising the step of determining a local sidereal time.

4. The method of claim 3, wherein the step of determining the local sidereal time comprises the step of receiving a date, a time, a latitude and a longitude.

5. The method of claim 1, wherein the step of calculating, for each associated capture time in the plurality of associated capture times, coordinates in the optical instrument coordinate system for each of the plurality of objects comprises the step of calculating an axis1 coordinate and an axis2 coordinate for each object in the plurality of objects for each associated capture time in the plurality of associated capture times.

6. The method of claim 1, wherein each captured optical instrument position in the plurality of captured optical instrument positions in the optical instrument coordinate system comprises an axis1 coordinate and an axis2 coordinate.

7. The method of claim 1, wherein the plurality of captured optical instrument positions and the plurality of associated capture times comprises two or more captured optical instrument positions and associated capture times.

8. The method of claim 1, wherein the step of receiving the plurality of captured optical instrument positions and associated capture times comprises the steps of:
pointing the optical instrument to a first alignment object;
receiving a first alignment object selection signal when the optical instrument is pointed at the first alignment object; and,
storing a first captured optical instrument position and a first associated capture time when the first alignment object selection signal is received.

9. The method of claim 8, wherein the optical instrument is pointed at the first alignment object when the first alignment object is in a predetermined location in the field of view.

10. The method of claim 9, wherein the predetermined location is a center of the field of view.

11. The method of claim 8, wherein the step of receiving the plurality of captured optical instrument positions and associated capture times further comprises the steps of:
pointing the optical instrument to a second alignment object;
receiving a second alignment object selection signal when the optical instrument is pointed at the second alignment object; and,
storing a second captured optical instrument position and a second associated capture time when the second alignment object selection signal is received.

12. The method of claim 1, wherein the step of determining, for each associated capture time, the match for each captured optical instrument position in the plurality of captured optical instrument positions with the plurality of calculated object positions to create the list of actual alignment objects further comprises the steps of:
comparing (i) differences between each captured optical instrument position in the plurality of captured optical instrument positions to (ii) differences between each calculated object position in the plurality of calculated object positions for each associated capture time; and,
determining a subset of calculated object positions in the plurality of calculated object positions for each associated capture time that matches the plurality of captured optical instrument positions within a predetermined error threshold.

13. The method of claim 1, wherein the plurality of objects is limited to objects in the plurality of objects that match a predetermined criteria.

14. The method of claim 13, wherein the predetermined criteria being that an object be viewable by the optical instrument during the associated capture time.

15. The method of claim 1, wherein the plurality of objects is limited to objects selected by using a time, date and location input by the user.

16. The method of claim 1, wherein the optical instrument coordinate system is based on a rectangular coordinate system.

17. The method of claim 16, wherein the rectangular coordinate system is an altitude-azimuth coordinate system.

18. The method of claim 1, wherein the optical instrument coordinate system is based on a spherical coordinate system.

19. The method of claim 18, wherein the spherical coordinate system is a right ascension-declination coordinate system.

20. An alignment system for aligning an optical instrument with respect to a celestial coordinate system, the optical instrument having a field of view and an optical instrument coordinate system, the alignment system comprising:
a processor;
an object database storing a plurality of objects, each having celestial coordinates; and,
a computer-readable medium having instructions stored thereon that, when executed by the processor, performs the steps of:
receiving a plurality of captured optical instrument positions in the optical instrument coordinate system along with a plurality of associated capture times;
calculating, for each associated capture time in the plurality of associated capture times, coordinates in the optical instrument coordinate system for all objects in the plurality of objects to create a plurality of calculated object positions for each associated capture time; and,
determining, for each associated capture time, a match for each captured optical instrument position in the plurality of captured optical instrument positions with the plurality of calculated object positions to create a list of actual alignment objects.

21. The alignment system of claim 20, wherein the computer-readable medium having instructions stored thereon that, when the instructions are executed by the processor, further performs the step of using the plurality of actual alignment objects to align the optical instrument.

22. The alignment system of claim 20, wherein the computer-readable medium having instructions stored thereon that, when the instructions are executed by the processor, further performs the step of determining a local sidereal time.

23. The alignment system of claim 22, wherein the step of determining the local sidereal time comprises the step of receiving a date, a time, a latitude and a longitude.

24. The alignment system of claim 20, wherein the step of calculating, for each associated capture time in the plurality of associated capture times, coordinates in the optical instrument coordinate system for each of the plurality of objects comprises the step of calculating an axis1 coordinate and an axis2 coordinate for each object in the plurality of objects for each associated capture time in the plurality of associated capture times.

25. The alignment system of claim 20, wherein each captured optical instrument position in the plurality of captured optical instrument positions in the optical instrument coordinate system comprises an axis1 coordinate and an axis2 coordinate.

26. The alignment system of claim 20, wherein the plurality of captured optical instrument positions and the plurality of associated capture times comprises two or more captured optical instrument positions and associated capture times.

27. The alignment system of claim 20, wherein the step of receiving the plurality of captured optical instrument positions and associated capture times comprises the steps of:
pointing the optical instrument to a first alignment object;
receiving a first alignment object selection signal when the optical instrument is pointed at the first alignment object; and,
storing a first captured optical instrument position and a first associated capture time when the first alignment object selection signal is received.

28. The alignment system of claim 27, wherein the optical instrument is pointed at the first alignment object when the first alignment object is in a predetermined location in the field of view.

29. The alignment system of claim 28, wherein the predetermined location is a center of the field of view.

30. The alignment system of claim 27, wherein the step of receiving the plurality of captured optical instrument positions and associated capture times further comprises the steps of:
pointing the optical instrument to a second alignment object;
receiving a second alignment object selection signal when the optical instrument is pointed at the second alignment object; and,
storing a second captured optical instrument position and a second associated capture time when the second alignment object selection signal is received.

31. The alignment system of claim 20, wherein the step of determining, for each associated capture time, the match for each captured optical instrument position in the plurality of captured optical instrument positions with the plurality of calculated object positions to create the list of actual alignment objects comprises the steps of:
comparing (i) differences between each captured optical instrument position in the plurality of captured optical instrument positions to (ii) differences between each calculated object position in the plurality of calculated object positions for each associated capture time; and,
determining a subset of calculated object positions in the plurality of calculated object positions for each associated capture time that matches the plurality of captured optical instrument positions within a predetermined error threshold.

32. The alignment system of claim 20, wherein the plurality of objects is limited to objects in the plurality of objects that match a predetermined criteria.

33. The alignment system of claim 32, wherein the predetermined criteria being that an object be viewable by the optical instrument during the associated capture time.

34. The alignment system of claim 20, wherein the plurality of objects is limited to objects selected by using a time, date and location input by the user.

35. The alignment system of claim 20, wherein the optical instrument coordinate system is based on a rectangular coordinate system.

36. The alignment system of claim 35, wherein the rectangular coordinate system is an altitude-azimuth coordinate system.

37. The alignment system of claim 20, wherein the optical instrument coordinate system is based on a spherical coordinate system.

38. The alignment system of claim 37, wherein the spherical coordinate system is a right ascension-declination coordinate system.

39. A computer readable medium having instructions stored thereon, the stored instructions, when executed by a processor in an optical instrument having a field of view and an optical instrument coordinate system, causes the processor to perform a method for aligning the optical instrument with respect to a celestial coordinate system, the celestial coordinate system having a plurality of objects each having celestial coordinates, the method comprising the steps of:

receiving a plurality of captured optical instrument positions in the optical instrument coordinate system along with a plurality of associated capture times;

calculating, for each associated capture time in the plurality of associated capture times, coordinates in the optical instrument coordinate system for the plurality of objects to create a plurality of calculated object positions for each associated capture time; and, determining, for each associated capture time, a match for each captured optical instrument position in the plurality of captured optical instrument positions with the plurality of calculated object positions to create a list of actual alignment objects.

40. The computer readable medium of claim 39, wherein the method further comprises the step of using the plurality of actual alignment objects to align the optical instrument.

41. The computer readable medium of claim 39, wherein the method further comprises the step of determining a local sidereal time.

42. The computer readable medium of claim 41, wherein the step of determining the local sidereal time comprises the step of receiving a date, a time, a latitude and a longitude.

43. The computer readable medium of claim 39, wherein the step of calculating, for each associated capture time in the plurality of associated capture times, coordinates in the optical instrument coordinate system for each of the plurality of objects comprises the step of calculating an axis1 coordinate and an axis2 coordinate for each object in the plurality of objects for each associated capture time in the plurality of associated capture times.

44. The computer readable medium of claim 39, wherein each captured optical instrument position in the plurality of captured optical instrument positions in the optical instrument coordinate system comprises an axis1 coordinate and an axis2 coordinate.

45. The computer readable medium of claim 39, wherein the plurality of captured optical instrument positions and the plurality of associated capture times comprises two or more captured optical instrument positions and associated capture times.

46. The computer readable medium of claim 39, wherein the step of receiving the plurality of captured optical instrument positions and associated capture times comprises the steps of:

pointing the optical instrument to a first alignment object;

receiving a first alignment object selection signal when the optical instrument is pointed at the first alignment object; and, storing a first captured optical instrument position and a first associated capture time when the first alignment object selection signal is received.

47. The computer readable medium of claim 46, wherein the optical instrument is pointed at the first alignment object when the first alignment object is in a predetermined location in the field of view.

48. The computer readable medium of claim 47, wherein the predetermined location is a center of the field of view.

49. The computer readable medium of claim 46, wherein the step of receiving the plurality of captured optical instrument positions and associated capture times further comprises the steps of:

pointing the optical instrument to a second alignment object;

receiving a second alignment object selection signal when the optical instrument is pointed at the second alignment object; and, storing a second captured optical instrument position and a second associated capture time when the second alignment object selection signal is received.

50. The computer readable medium of claim 39, wherein the step of determining, for each associated capture time, the match for each captured optical instrument position in the plurality of captured optical instrument positions with the plurality of calculated object positions to create the list of actual alignment objects comprises the steps of:

comparing (i) differences between each captured optical instrument position in the plurality of captured optical instrument positions to (ii) differences between each calculated object position in the plurality of calculated object positions for each associated capture time; and, determining a subset of calculated object positions in the plurality of calculated object positions for each associated capture time that matches the plurality of captured optical instrument positions within a predetermined error threshold.

51. The computer readable medium of claim 39, wherein the plurality of objects is limited to objects in the plurality of objects that match a predetermined criteria.

52. The computer readable medium of claim 51, wherein the predetermined criteria being that an object be viewable by the optical instrument during the associated capture time.

53. The computer readable medium of claim 39, wherein the plurality of objects is limited to objects selected by using a time, date and location input by the user.

54. The computer readable medium of claim 39, wherein the optical instrument coordinate system is based on a rectangular coordinate system.

55. The computer readable medium of claim 54, wherein the rectangular coordinate system is an altitude-azimuth coordinate system.

56. The computer readable medium of claim 39, wherein the optical instrument coordinate system is based on a spherical coordinate system.

57. The computer readable medium of claim 56, wherein the spherical coordinate system is a right ascension-declination coordinate system.

* * * * *